July 17, 1956 T. H. RINER 2,754,611
TROLLING ATTRACTOR FOR USE IN FISHING
Filed July 20, 1955
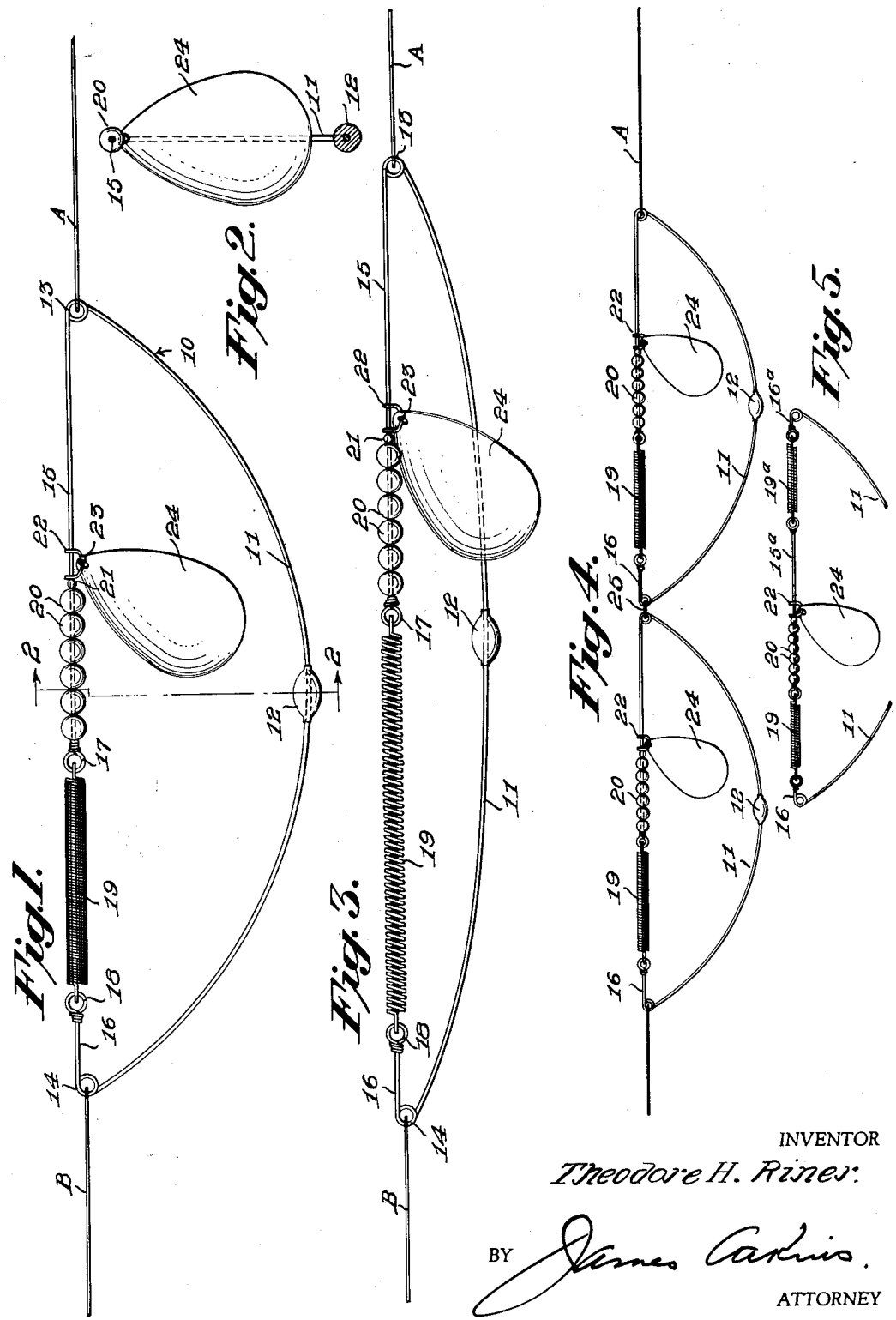
INVENTOR
Theodore H. Riner
BY James Larkin
ATTORNEY

United States Patent Office 2,754,611
Patented July 17, 1956

2,754,611

TROLLING ATTRACTOR FOR USE IN FISHING

Theodore H. Riner, Bakersfield, Calif.

Application July 20, 1955, Serial No. 523,155

9 Claims. (Cl. 43—42.19)

This invention relates to a trolling attractor for use in fishing.

The invention is more particularly concerned with a trolling attractor of the character embodying fish attracting bright bodies supported on an axis, together with a spinning blade which is rotatable about said axis for enhancing the attraction afforded by said bodies.

Structures of this general character have been known and used heretofore, but same failed to satisfy the maximum requirements of attractors or spinners, particularly in view of the fact that such structures were longitudinally rigid and the spinning blades embodied therein were free to rotate under all fishing conditions.

It is the primary purpose of spinning blades to rotate about an axis upon movement thereof through the water for attracting fish to bait adjacent the spinner, but it has been found that after a fish has been hooked, the attraction afforded by the spinner blade is of no value and, furthermore, the continued rotation of the spinner blade provides substantial resistance to the hooked fish running freely against an angler's rod, which is in fact an important action in fishing sport.

Furthermore, the longitudinally rigid trolling attractors heretofore used provided no relative movement between a hooked fish and the trolling attractor, with the result that the line was subjected to a jerk with a resulting uncertain setting of the hook, and the fish in many instances broke loose when the rod was held high in bringing in the fish to the net.

It is accordingly a primary object of this invention to generally improve trolling attractors whereby the above noted objections thereto are substantially wholly overcome.

A further object of the invention is to provide a trolling attractor including a shaft for longitudinal alinement with a fish line and which shaft supports a spinning blade for rotation about the axis thereof, together with means for positively stopping rotation of said blade upon a predetermined tension in the line.

A still further object of the invention is to provide longitudinally resilient means with which one or both ends of said shaft is secured.

A still further object of the invention is to provide a resilient guard in the trolling attractor structure which upon extension of said resilient means intersects the path of rotation of the spinner blade for arresting rotation thereof.

Other objects and advantages of the invention will become apparent in the course of the following detailed description, taken in connection with the accompanying drawing, wherein—

Figure 1 is a side elevational view of the improved trolling attractor in accordance with a preferred structural embodiment thereof, and wherein the structure is substantially of actual size.

Fig. 2 is a vertical sectional view as observed in the plane of line 2—2 on Fig. 1.

Fig. 3 is a view corresponding to Fig. 1, but showing the trolling structure deformed as occurs upon longitudinal tension resulting from the action of a hooked fish.

Fig. 4 is a side elevational view showing a pair of the trolling attractors connected in tandem in accordance with prevailing practice.

Fig. 5 is a fragmental side elevational view of a modified form of trolling attractor, shown on a substantially reduced scale.

Referring now in detail to the drawing, and first to Figs. 1 and 2 thereof, the attractor is designated generally as 10, and same includes a downwardly bowed resilient guard 11 which is provided intermediate its ends with a suitable weight 12.

The guard is preferably formed of relatively light gauge resilient wire which at its opposite ends is provided with coils 13 and 14 and from which co-axial extensions 15 and 16 extend, the former of which is of substantial length and provides a shaft for the spinner blade.

The adjacent ends of extensions 15 and 16 are provided with eyes 17 and 18 to which are connected the opposite ends of a relatively light coil spring 19 which is normally fully contracted, as indicated in Fig. 1.

A plurality of bright beads or similar attracting objects 20 are loosely disposed on the shaft 15 adjacent the eye 17 and which may be spherical, as shown, or of prismatic form.

A relatively small spherical bearing 21 is loosely disposed on the shaft 15 in contacting relation to the outermost bead 20, and a clevis 22 is rotatably supported on the shaft and which extends loosely through an aperture 23 in the upper end of a concave-convex spinning blade 24.

A casting line A has an end thereof secured to coil 13, and a leader line B has an end thereof secured to coil 14.

When the trolling attractors are used in tandem, as shown in Fig. 4, they are connected by a link 25 which extends through adjacent coils 13 and 14.

Having set forth a preferred structure of the improved trolling attractor, the operation thereof is as follows.

With the structure as shown in Figs. 1 and 4 connected between the casting line A and the leader line B the same will retain its normal form as shown with guard 11 depending to its maximum below the spinner shaft 15 and with the spring 19 fully collapsed until a fish is hooked. Upon the hooking of a fish, the leader line B will be substantially tensioned with a resulting extension of the spring 19 and a corresponding flattening of the spring wire guard 11, as indicated in Fig. 3, where it will be seen that the guard 11 intersects the path of rotation of the spinner blade 24, whereby same will have only a cutting action in the water and the hooked fish will be free to run against the angler's rod, thereby substantially enhancing the sport.

The spring 19 further acts as a shock absorber, aids in setting the hook more firmly and also aids in preventing fish from breaking loose when the rod is held high to bring them into a net.

While member 11 will properly function as a guard in the absence of the weight 12, the latter acts to prevent rotation of the entire trolling attractor.

A spring 19 is disclosed as preferable, but other resilient means may be used.

In accordance with the modified embodiment of the invention, illustrated in Fig. 5, the member 11 is provided with relatively short axially alined extensions 16 and 16ª to which the opposed ends of a pair of resilient members 19 and 19ª are connected, and a spinner shaft 15ª is disposed between the resilient members with the opposite ends thereof connected to the adjacent ends of the resilient members. Thus, the shaft 15ª is disposed intermediate the ends of the resilient bowed guard 11 and is provided with beads 20, clevis 22, and spinner blade 24, as in the first described form of the invention.

Regardless of the particular detail construction, the essential feature of the invention is a bowed, weighted, resilient guard, a connection between the ends of the guard, including a spinner shaft having a spinning blade mounted thereon for rotation about the axis thereof, and resilient means normally in a retracted condition for maintaining the guard in its bowed form for free rotation of the blade about said shaft, and wherein the resilient means upon extension thereof causes the bowed guard to intersect the path of rotation of the blade for the purpose set forth.

The invention has been disclosed in accordance with certain specific structural embodiments thereof, but such are to be considered as illustrative only, and not restrictive, the scope of the invention being defined in the following claims.

What I claim and desire to secure by U. S. Letters Patent is:

1. A trolling attractor comprising an elongated spinner shaft, a spinning blade supported on the shaft for rotation about the axis thereof, a bowed resilient guard, means connecting the oppostie ends of the guard to said spinner shaft including yieldable means, said yieldable means normally holding the guard out of the path of rotation of the spinning blade and which under tension thereof moves the guard into intersection with the path of rotation of the spinning blade, for the purpose set forth.

2. A trolling attractor comprising an elongated spinner shaft, a spinning blade supported on the shaft for rotation about the axis thereof, longitudinally yieldable means having one end thereof connected to an adjacent end of the shaft, and a bowed resilient guard having one end thereof connected to the opposite end of said yieldable means and the other end thereof connected to the opposite end of said shaft for the purpose set forth.

3. The structure according to claim 2, together with a plurality of attracting bodies loosely supported on said shaft intermediate said spinning blade and said yieldable means.

4. The structure according to claim 2, together with a weight on said guard intermediate the ends thereof for the purpose set forth.

5. The structure according to claim 2, wherein said shaft and said guard comprise a single length of relatively light gauge spring wire.

6. A trolling attractor, comprising a single length of relatively light gauge spring wire including a major downwardly extending bowed guard portion having a coil at each end thereof, a spinner shaft extending horizontally inwardly from one of said coils, a relatively short horizontal extension projecting inwardly from the other coil in co-axial relation to the shaft, an elongated resilient member having its opposite ends connected to adjacent ends of said shaft and said extension, and a spinner blade rotatably supported on said shaft.

7. The structure according to claim 6, together with a plurality of attracting bodies loosely supported on said shaft intermediate said resilient member and said spinner blade.

8. The structure according to claim 6, together with a weight supported on said guard portion centrally thereof.

9. The structure according to claim 6, wherein said resilient member comprises an elongated normally contracted coil spring.

References Cited in the file of this patent

UNITED STATES PATENTS

| | | |
|---|---|---|
| 1,062,980 | Lewis | May 27, 1913 |
| 1,250,053 | Tukey | Dec. 11, 1917 |
| 2,540,713 | Crook | Feb. 6, 1951 |
| 2,665,903 | Green | Jan. 12, 1954 |